US011332251B1

(12) United States Patent
Selvakkumaran Sathyan et al.

(10) Patent No.: US 11,332,251 B1
(45) Date of Patent: May 17, 2022

(54) OVERHEAD BIN ACCESS BY BOARDING PASS

(71) Applicant: B/E Aerospace, Inc., Winston-Salem, NC (US)

(72) Inventors: Alagan Thiruvarul Selvakkumaran Sathyan, Krishnagiri (IN); Hemanth Kumar Pennam, Bengaluru (IN)

(73) Assignee: B/E Aerospace, Inc., Winston-Salem, NC (US)

( * ) Notice: Subject to any disclaimer, the term of this patent is extended or adjusted under 35 U.S.C. 154(b) by 0 days.

(21) Appl. No.: 17/194,680

(22) Filed: Mar. 8, 2021

(30) Foreign Application Priority Data

Dec. 12, 2020 (IN) .............................. 202041054155

(51) Int. Cl.
*B64D 11/00* (2006.01)
*G07C 9/00* (2020.01)
*G06K 7/14* (2006.01)

(52) U.S. Cl.
CPC .......... *B64D 11/003* (2013.01); *G06K 7/1413* (2013.01); *G07C 9/00896* (2013.01); *G07C 2009/0092* (2013.01)

(58) Field of Classification Search
CPC ................ B64D 11/003; G06K 7/1417; G07C 9/00896; G07C 2009/0092
USPC .............................. 235/462.1, 462.09, 462.01
See application file for complete search history.

(56) References Cited

U.S. PATENT DOCUMENTS

| 5,456,529 | A | 10/1995 | Cheung |
| 7,726,606 | B2 | 6/2010 | Graf et al. |
| 11,010,854 | B2 * | 5/2021 | Cheikh .................. G01G 19/52 |
| 2006/0022090 | A1 * | 2/2006 | McCoskey ............. B64F 1/305 244/137.1 |
| 2015/0083858 | A1 * | 3/2015 | Jindel .................... G06Q 10/08 244/118.5 |
| 2018/0086464 | A1 | 3/2018 | Riedel et al. |
| 2018/0215467 | A1 | 8/2018 | Sankrithi et al. |
| 2018/0257554 | A1 | 9/2018 | Simms et al. |
| 2019/0147558 | A1 * | 5/2019 | Cheikh .................. G06Q 50/30 361/679.4 |
| 2019/0263525 | A1 | 8/2019 | Cloud et al. |

FOREIGN PATENT DOCUMENTS

| CA | 2996602 A1 | 9/2018 |
| CN | 109636281 A | 4/2019 |
| IN | 3128CHE2015 A | 12/2016 |
| WO | 2020032790 A1 | 2/2020 |

OTHER PUBLICATIONS

Simmons, Gary et al., "Advancements In Overhead Stowage Bin Article Retention", Boeing Commercial Airlines, https://www.smartcockpit.com/docs/Advancements_In_Overhead_Stowage_Bin_Article_Retention.pdf, Downloaded Oct. 29, 2020, 4 pages.

* cited by examiner

*Primary Examiner* — Paultep Savusdiphol
(74) *Attorney, Agent, or Firm* — Suiter Swantz pc llo

(57) ABSTRACT

A boarding pass may include a barcode with an encoded seat identifier. An overhead storage system may include a barcode reader configured to read the barcode of the boarding pass. The system may determine whether the boarding pass is eligible to access an overhead bin based on the encoded seat identifier. Where the boarding pass is eligible, a signal may be sent to one or more actuators of the overhead bin. Thus, a user may selectively access the overhead bin by the boarding pass.

20 Claims, 10 Drawing Sheets

OVERHEAD BIN ACCESS BY BOARDING PASS

CROSS-REFERENCE TO RELATED APPLICATIONS

The present application claims the benefit of India Provisional Patent Application No. 202041054155, filed Dec. 12, 2020, entitled Overhead Bin Access By Boarding Pass, naming Alagan Thiruvarul Selvakkumaran Sathyan and Hemanth Kumar Pennam as inventors, which is incorporated by reference in the entirety.

BACKGROUND

Passenger transports such as aircraft may keep passenger bags in personal storage areas such as an overhead bin. To open the overhead bin a user, such as a passenger or a steward, typically must pull a handle. In this regard, the user must physically touch the overhead bin, thereby sharing a common point of interaction. Sharing a common point of interaction may be undesirable due to viral concerns. Furthermore, the overhead bin may be opened and closed by any user, without regard to the user's identity.

Therefore, it would be advantageous to provide a system that cures the shortcomings described above.

SUMMARY

A system is disclosed, in accordance with one or more embodiments of the present disclosure. The system includes a barcode reader including a slot configured to receive a boarding pass. The barcode reader is configured to read a barcode of the boarding pass when the boarding pass is received by the slot. The barcode further includes an encoded seat identifier. The system may also include an overhead bin including an actuator configured to open the overhead bin. The system may also include a controller communicatively coupled with the barcode reader and the actuator. The controller may include a processor and a memory, where the processor is configured to execute program instructions maintained on the memory. The program instructions may cause the processor to determine whether the boarding pass is eligible to open the overhead bin based on the encoded seat identifier. Upon determining the boarding pass is eligible, the controller may provide a signal to the actuator causing the actuator to open the overhead bin. The processor may further provide an additional signal to the actuator causing the actuator to close the overhead bin.

A method is disclosed, in accordance with one or more embodiments of the present disclosure. The method may include reading a barcode of a boarding pass by a barcode reader, wherein the barcode reader is communicatively coupled with an actuator of an overhead bin. The method may also include determining whether the boarding pass is eligible to open the overhead bin based on a seat identifier encoded in the barcode. The method may also include generating an indicator that the overhead bin is open. The method may also include providing a signal to the actuator of the overhead bin to open the overhead bin in response to determining the boarding pass is eligible. The method may also include providing an additional signal to the actuator to close the overhead bin. The method may also include generating an additional indicator that the overhead bin is closed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION

Figure 1A:
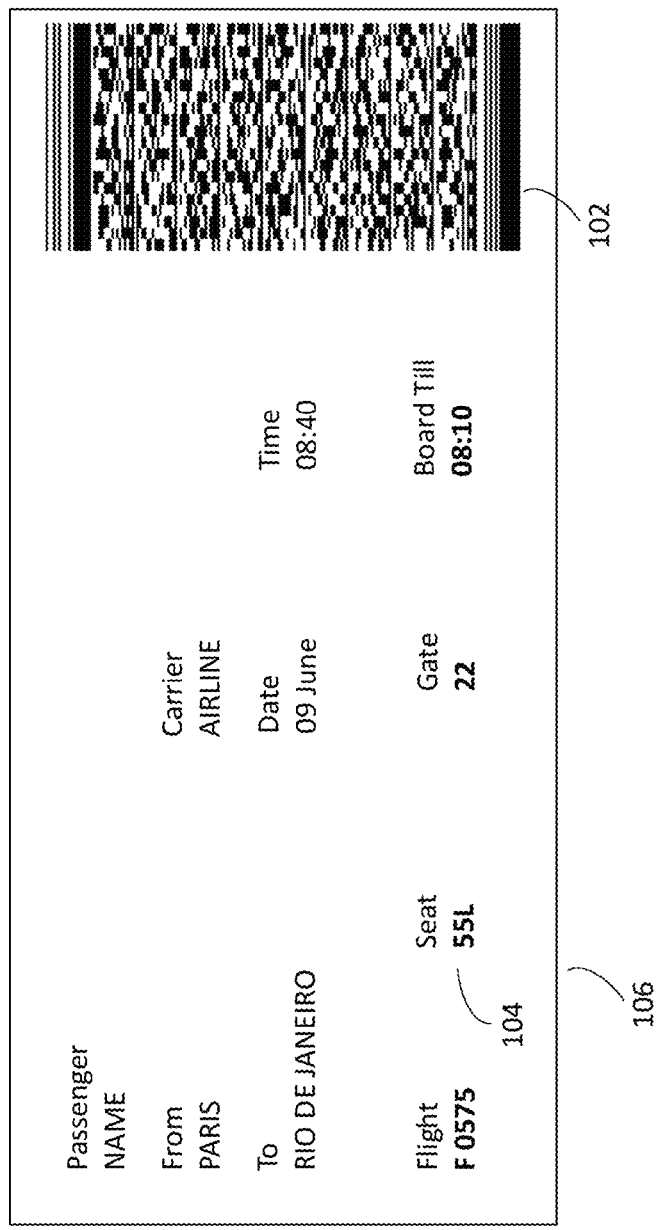
FIGS. 1A-1B illustrate a boarding pass, in accordance with one or more embodiments of the present disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

Embodiments of the present disclosure are generally directed to a system for opening an overhead bin. The system may include a barcode reader. The barcode reader may be configured to read a barcode of a boarding pass. The barcode may include a seat identifier, such as a seat number, seat row, and/or a seat zone. The seat identifier may be compared with an access privilege. Based on the comparison, a signal may be sent to an actuator of the overhead bin. Upon receiving the signal, the actuator may be engaged to open the overhead bin. When the overhead bin is opened, a user may insert luggage into the overhead bin for storage. An additional signal may then be sent to the actuator. Upon receiving the additional signal, the actuator may further close the overhead bin. The additional signal may be provided when the boarding pass is removed from the barcode reader.

Figure 1B:
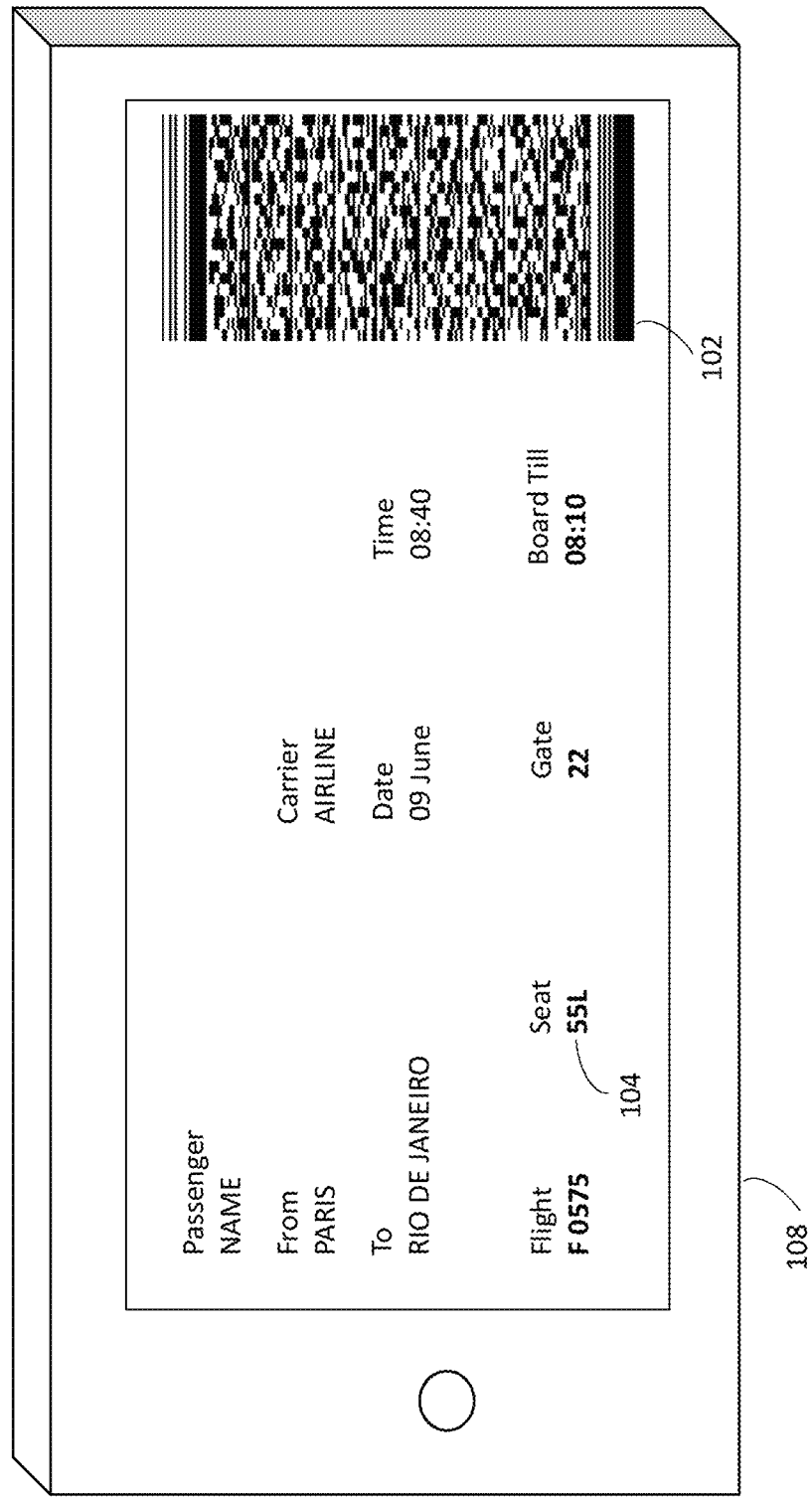

FIGS. 1A and 1B depict a boarding pass 100, in accordance with one or more embodiments of the present disclosure.

In embodiments, a boarding pass 100 includes a barcode 102 and a seat number 104. The barcode 102 may include a two-dimensional (2D) barcode. Such 2D barcode may include an encoded seat identifier, such as, but not limited to, the seat number 104 a seat row, or a seat zone (see, for example, FIG. 4). As depicted, the seat number 104 of the boarding pass 100 is 55L. Encoded within the barcode 102 is the seat number 55L. The seat number may include two components, a first component indicative of a row on the airplane (e.g., row 55), and a second component indicative of a column on the airplane (e.g., column L). Optionally, the barcode 102 may also have an encoded seat zone (e.g., the extra-leg room zone as encoded). The seat number, seat row, and seat zone described is not intended to be limiting, but is merely exemplary of encoding the barcode 102 with a seat identifier. Such seat identifier may be accessed by an overhead storage system when determining whether the boarding pass is eligible for accessing an overhead bin, in accordance with one or more embodiments of the present disclosure.

In embodiments, the barcode 102 may further include various other encoded information, such as, but not limited to, a format code, a passenger name, a departure airport, a destination airport, a flight number, a carrier, one or more date information, a frequent flyer number, and/or a sequence number (e.g., an order checked-in at a gate). Furthermore, the barcode 102 may be encoded by any suitable standard, such as, but not limited to, a PDF417 format (ISO standard 15438).

As depicted in FIG. 1A, the boarding pass 100 may be a printed boarding pass 106. The printed boarding pass 106 may be printed on any suitable material such as, but not limited to, paper, cardstock, or plastic. As depicted in FIG. 1B, the boarding pass 100 may also be displayed on a user device 108. The user device 108 may include any suitable device for displaying the boarding pass 100, such as, but not limited to, a cellular phone or an electronic watch.

The boarding pass 100 depicted in FIGS. 1A-1B is not intended to be limited to the configuration of the barcode 102 depicted. Rather the boarding pass 100 illustrated is merely provided as an exemplary configuration of a boarding pass with a barcode including an encoded seat identifier. In this regard, the boarding pass 100 may be configured in any suitable configuration. For example, the barcode 102 may be disposed on the boarding pass 100 along one or more edges of the boarding pass 100. By way of another example, the barcode 102 may be oriented in any suitable orientation, such as, but not limited to in a vertical or horizontal orientation. Furthermore, the various information (e.g., format code, passenger name, departure airport, destination airport, flight number, carrier, date information, frequent flyer number, sequence number, etc.) encoded on the barcode 102 and disposed on the boarding pass 100 is not intended to be limiting.

Figure 2:
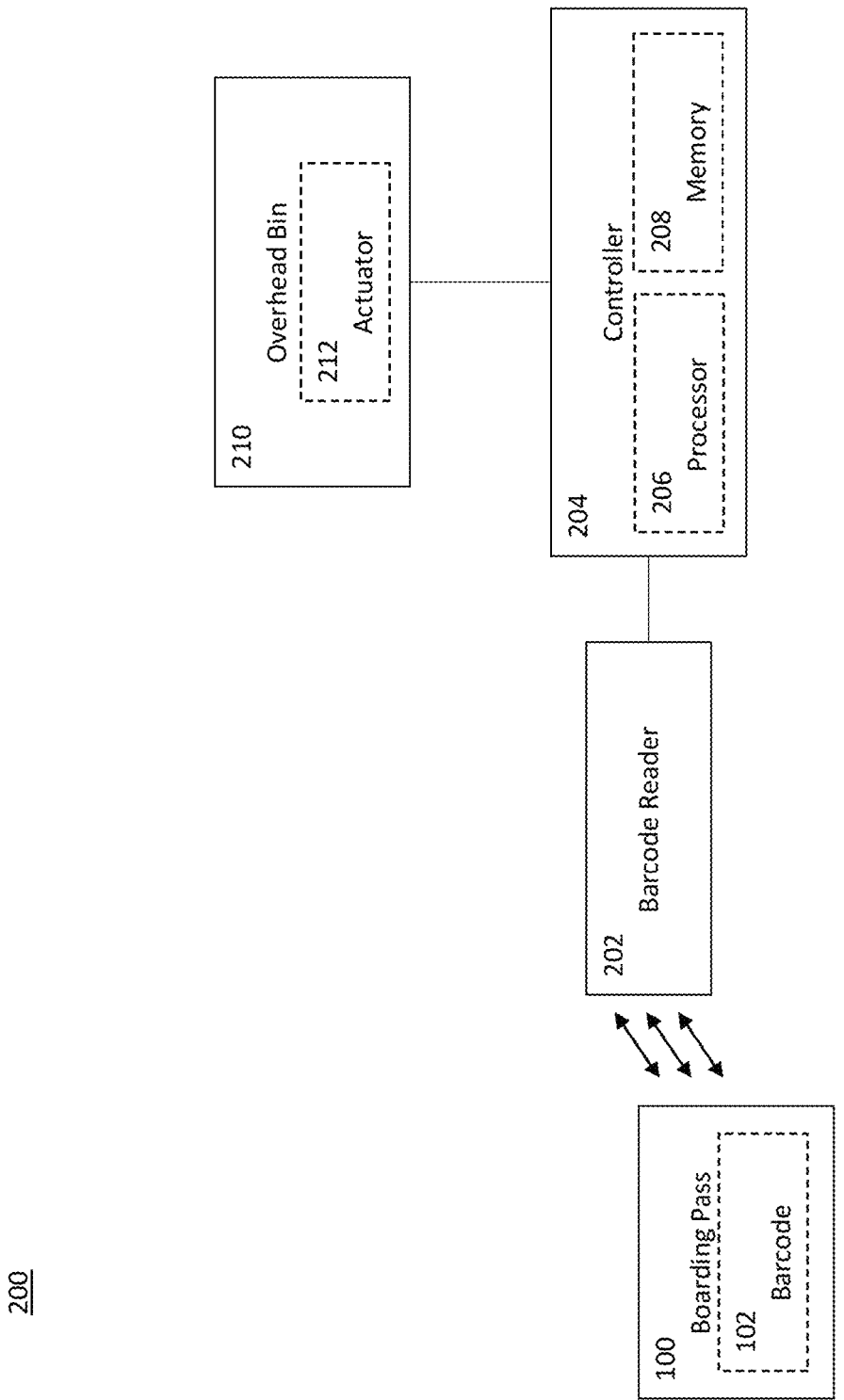
FIG. 2 is a schematic diagram of an overhead storage system, in accordance with one or more embodiments of the present disclosure.

FIG. 2 depicts an overhead storage system 200, in accordance with one or more embodiments of the present disclosure.

In embodiments, the system 200 includes a barcode reader 202. The barcode reader 202 may be configured to read the barcode 102 of the boarding pass 100. The barcode reader 202 may be configured to read the barcode 102 by any suitable mechanism, such as, but not limited to, a laser scanner, a charge coupling device, one or more photoelectric cells, or a camera. Upon reading the barcode 102, the barcode reader 202 may provide the barcode 102 to a controller 204.

In embodiments, the system 200 includes the controller 204 which is configured to receive the barcode 102 read from the barcode reader 202. The controller 204 may include a processor 206 and a memory 208. The processor 206 of the controller 204 may be configured to execute one or more process steps maintained on the memory 208, such as, but not limited to, determining whether the boarding pass 100 associated with the barcode 102 is eligible to open an overhead bin 210, providing a signal to an actuator 212 of the overhead bin 210 in response to determining the boarding pass 100 is eligible, and providing a signal to the actuator 212 to close the overhead bin.

For example, the processor 206 may receive the encoded seat identifier read from the barcode 102 by the barcode reader 202. The processor may then compare such encoded seat identifier with an access privilege associated with the overhead bin 210. The access privilege may be stored in the memory 208, and may be indicative of a seat, a row, or a seat zone which is allowed to access the overhead bin 210. If the encoded seat identifier matches the access privilege, the boarding pass is thus eligible to open the overhead bin.

In some instances, the access privilege associated with the overhead bin 210 may be such that only boarding passes with a specific seat number may access the overhead bin 210 (e.g., only seat 55L may access). In other instances, the access privilege associated with the overhead bin 210 may be such that only boarding passes with a specific row number may access the overhead bin 210 (e.g., only row 55 may access). In other instances, the access privilege associated with the overhead bin 210 may be such that only boarding passes with a specific seat zone may access the overhead bin 210 (e.g., only extra leg room passes may access). In this regard, the choice of seat number, seat row, or seat zone, for the access privilege may be selected to provide more or less access to the overhead bin 210. As may be understood, the specific seat numbers, seat rows, and seat zones described herein are not intended to be limiting, but are merely provided for example.

Where the boarding pass is determined to not be eligible to access the overhead bin based on the comparison of the encoded seat identifier and the access privilege, the controller 204 may either do nothing or provide a notification to the user (e.g., by way of a visual or aural indicator). In this regard, the system 200 may prevent users which do not have an appropriate seat identifier from accessing the overhead bin 210.

Where the boarding pass is determined to be eligible, the controller 204 may provide a signal to the actuator 212, by a communicative coupling between the controller 204 and the actuator 212. The signal may cause the actuator 212 to engage and automatically open the overhead bin 210. The signal may be any suitable signal. For example, the signal may include sending power to the actuator 212, thereby causing the actuator to open the cabin door. By way of another example, the signal may include a digital signal or other electrical signal. The actuator 212 may thus be configured to receive the digital signal and be engaged to open the overhead bin 210.

The overhead bin 210 may remain open once the actuator 212 has been engaged, allowing the user to add or withdraw personal items (e.g., luggage) from the overhead bin 210. For example, the overhead bin 210 may remain open for as long as the barcode reader 202 continues to read the boarding pass 100. The barcode reader 202 may thus continually read the barcode 102 of the boarding pass 100 (e.g., continually based on a frequency of which the barcode reader 202 reads the barcode 102). Upon removing the boarding pass 100 from the barcode reader 202, the barcode reader 202 may no longer read the barcode 102. The controller 204 may then send an additional signal to the actuator 212, causing the overhead bin 210 to be automatically closed. Thus, the boarding pass 100 may be used to selectively open and close the overhead bin 210. By way of another example, the overhead bin 210 may remain open for a designated period of time, such as, but not limited to, ten minutes or more. Upon reaching the designated period of time, the controller 204 may provide a signal to the actuator causing the actuator 212 to close the overhead bin 210. As may be understood, the description of providing an additional signal to the actuator is not intended to be limiting. In this regard, the additional signal may include providing power to the actuator, removing power from the actuator, or sending a digital signal to the actuator.

In embodiments, the overhead bin 210 may include any suitable type of overhead bin, such as, but not limited to, a shelf bin (e.g., where a door of the shelf bin opens upwards and out), a pivot bin (e.g., where the pivot bin pivots downwards about a pivot point), or a translating bin (e.g., where the translating bin translates downwards by a mechanism such as a four-bar linkage). Various overhead bins are discussed in "Advancements in Overhead Stowage Bin Article Retention", published in July 2001, by Gary Simmons et al., which is incorporated herein by reference in its entirety. In this regard, the type of overhead bin 210 is not intended to be limiting.

Depending on the type of the overhead bin 210 (e.g., shelf, pivot, or translating) a configuration of and a type of the actuator 212 may be selected to provide for a full range of motion in the overhead bin 210. Furthermore, where the overhead bin 210 is a pivot or translating bin, the actuator 212 may require a more powerful actuation force, as compared to an actuator for the shelf type, due to the actuator 212 of the pivot and translating type bins bearing at least a portion of a weight of the items stored in the overhead bin 210.

Figure 3A:
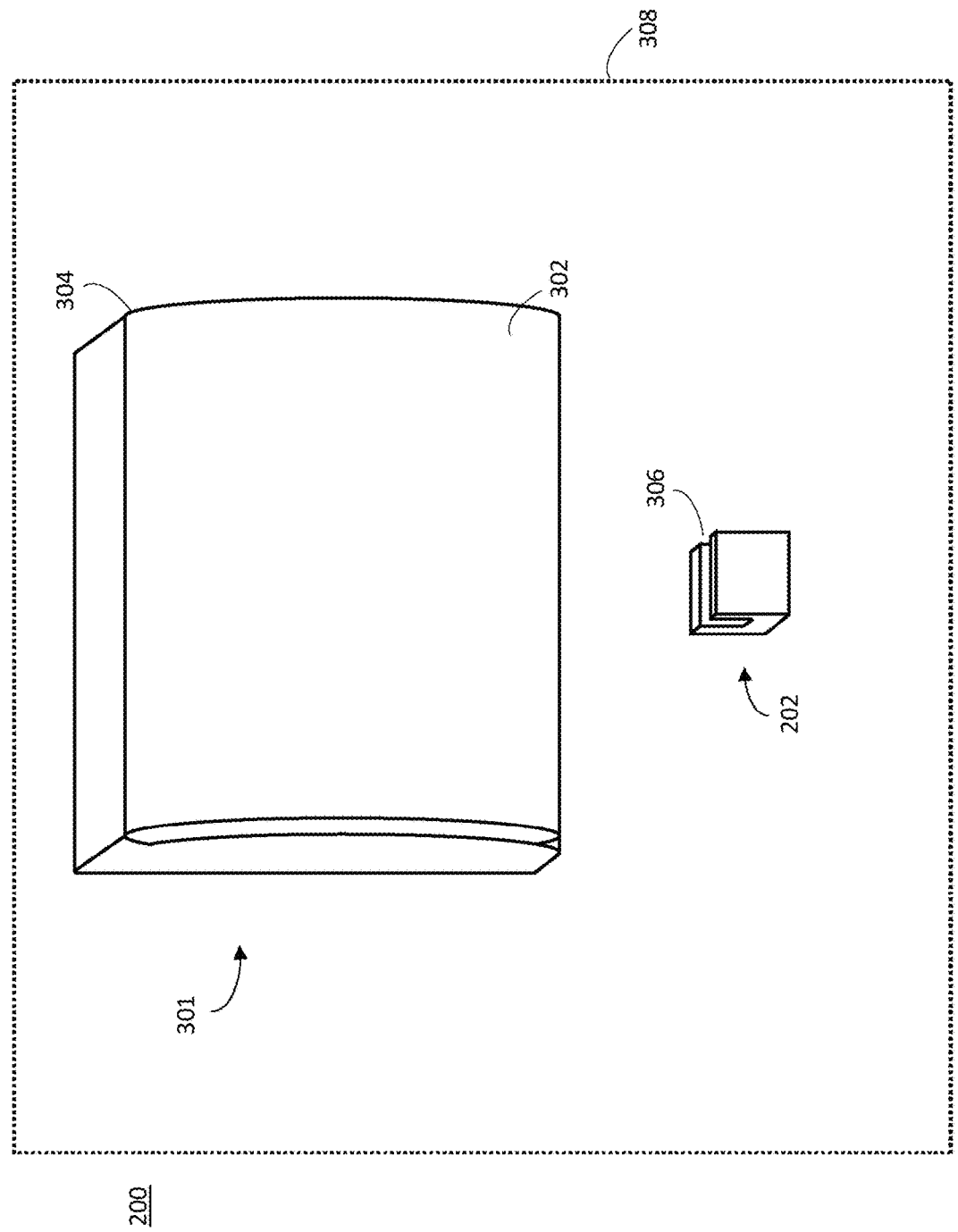
FIG. 3A depicts a front view of an overhead storage system, in accordance with one or more embodiments of the present disclosure.
Figure 3B:
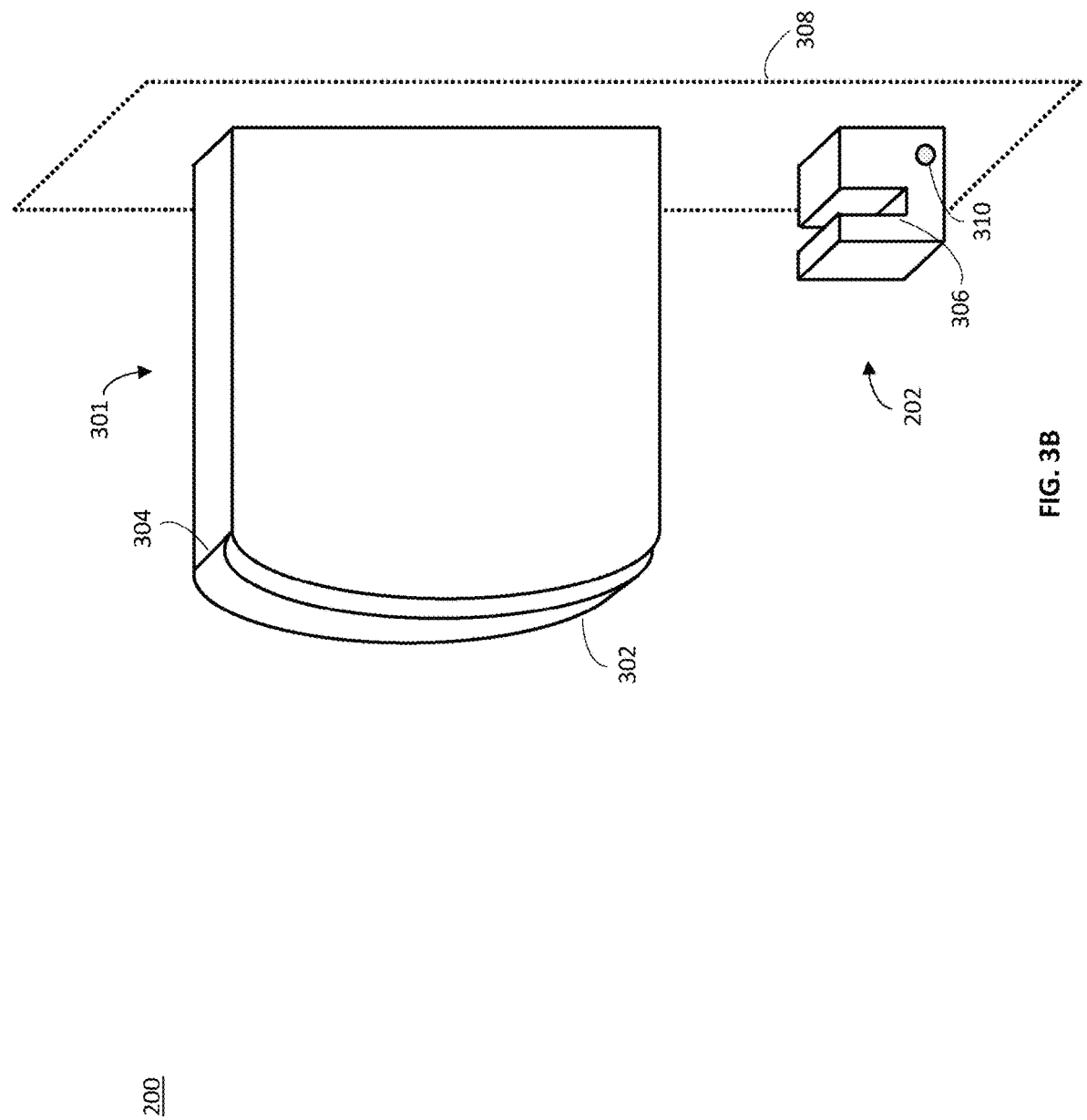
FIGS. 3B-3D depict a side view of an overhead storage system, in accordance with one or more embodiments of the present disclosure.
Figure 3C:
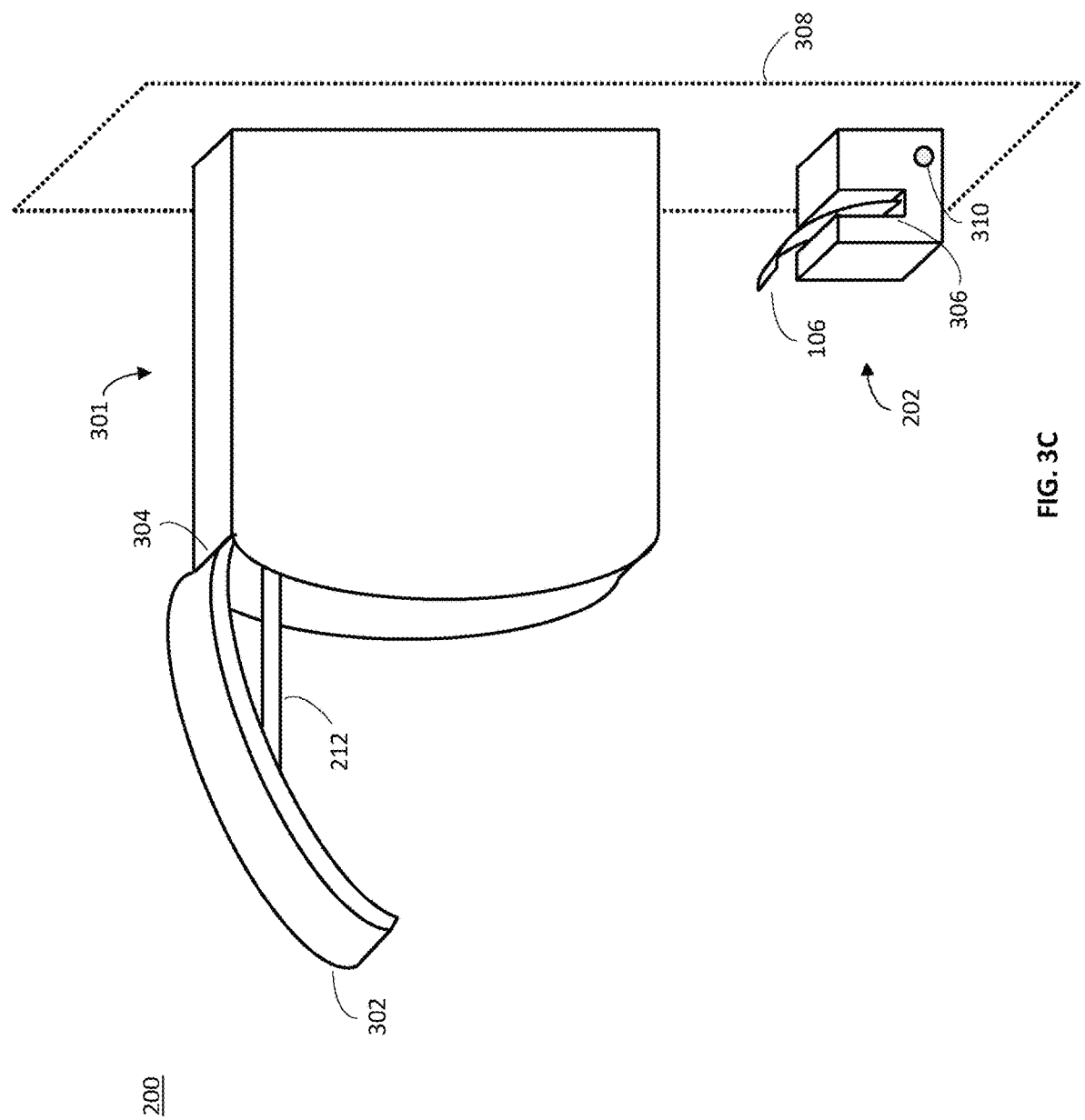
Figure 3D:
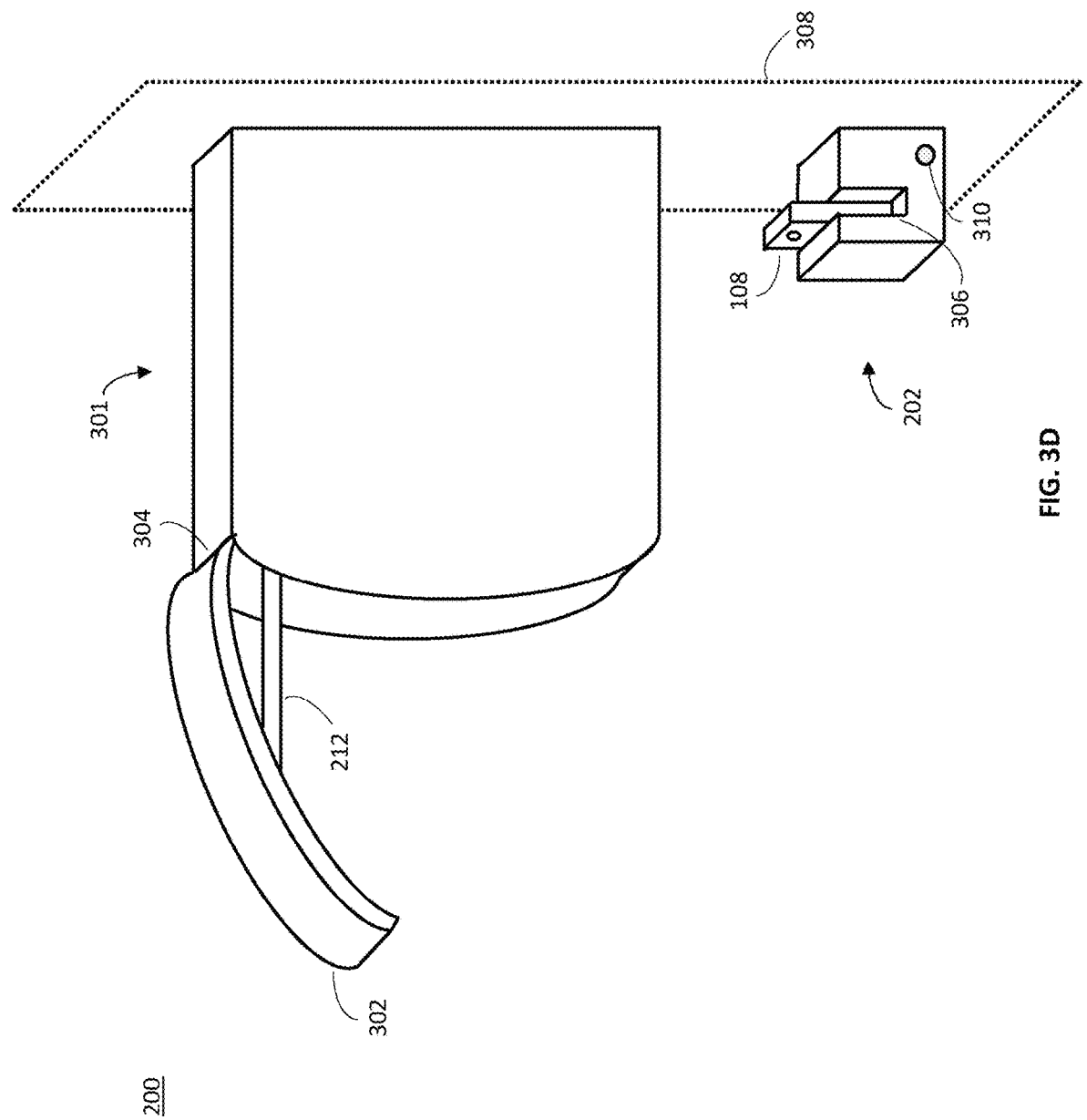

For example, where the overhead bin 210 includes a shelf type bin, the actuator 212 may include a hydraulic cylinder disposed inside of the overhead bin 210 along a top surface of the overhead bin 210 (see FIG. 3C-3D). The hydraulic cylinder may have a first connection to one of the top surface or a rear surface of the overhead bin. Furthermore, the actuator 212 may have a second connection to a door of the overhead bin. One or more of the first connection and the second connection may include a pivotal connection, allowing the actuator 212 to pivotably open and close the door of the overhead bin. By way of another example, A "luggage compartment that can be lowered comprising a hydraulic cylinder locking mechanism" is described in U.S. Pat. No. 7,726,606, by Olef Graft, which is incorporated herein by reference in its entirety. By way of another example, a "powered overhead storage bin" is described in U.S. Pat. No. 5,456,529, by Kwun-Wing Cheung, which is incorporated herein by reference in its entirety. By way of another example, "powered stowage bin assemblies" is described in U.S. patent application Ser. No. 15/907,929, published as US 2019/0263525, by Mark Cloud, which is incorporated herein by reference in its entirety. In this regard, the configuration and the type of the actuator 212 for the overhead bin 210 is not intended to be limiting.

FIGS. 3A-3D depict an exemplary configuration of the system 200, in accordance with one or more embodiments of the present disclosure.

As depicted in FIGS. 3A-3D, the overhead bin 210 may be a shelf type bin 301. The shelf type bin 301 may include a door 302 configured to open about an upper hinge 304. The door 302 of the shelf type bin 301 may be configured to pivot about the upper hinge 304 by way of the actuator 212. The actuator 212 may be engaged upon receiving a signal from the controller 204 (e.g., when the boarding pass 100 is determined to be eligible). The door 302 may remain in the pivoted open position by way of the actuator 212, until an additional signal is provided to the actuator 212. In this regard, a user may insert luggage into the shelf type bin 301. Upon removal of the boarding pass, an additional signal may be provided from the controller 204 to the actuator 212 to automatically close the door 302. Thus, the boarding pass 100 may be used to selectively open and close the overhead bin 210.

In embodiments, the barcode reader 202 may be attached to one or more surfaces of a passenger transport (e.g., an airplane). For example, the barcode reader 202 may be attached to a wall 308 of a cabin of the airplane. The barcode reader 202 may be attached to any portion of the wall 308 of the cabin, such as, but not limited to above and/or between one or more windows. The barcode reader 202 may be attached by any suitable fastener, such as, but not limited to, a nut plate, a hex nut, a key-locking insert, a rivet, a bolt, or a pin. Although not depicted, the barcode reader 202 may also be attached to a portion of the overhead bin 210, such as to the door 302 or to a side wall of the overhead bin 210.

In embodiments, the barcode reader 202 may include a slot 306. The slot 306 may have a width and a height suitable for receiving the boarding pass 100. A mechanism for reading the barcode from the boarding pass 100 may be disposed within the slot 306. The mechanism may include, but is not limited to, a laser scanner, a charge coupling device, one or more photoelectric cells, or a camera. As depicted in FIG. 3C, the slot 306 of the barcode reader 202 may be configured to receive the printed boarding pass 106. As depicted in FIG. 3D, the slot 306 of the barcode reader 202 may also be configured to receive the user device 108 which may display the boarding pass 100. In this regard, the system 200 may accommodate both printed and electronic boarding passes. As depicted in FIGS. 3C and 3D, the slot 306 is configured to receive the boarding pass 100, such that the barcode reader 202 reads the boarding pass 100 in a vertical orientation.

Although the barcode reader 202 is depicted as reading the boarding pass 100 (e.g., the printed boarding pass 106 or the user device 108) where the boarding pass 100 is in a vertical orientation, this is not intended to be limiting. In this regard, the barcode reader 202 may be configured to read the boarding pass 100 where the boarding pass 100 is in a horizontal direction. Reading the boarding pass 100 in a horizontal direction may be suitable depending on a location and/or an orientation of the barcode 102 on the boarding pass 100. Where the boarding pass 100 is read in the horizontal orientation, the slot 306 may have a width and a height suitable for receiving the boarding pass 100.

Thus, the boarding pass may be inserted and removed without touching the barcode reader 202 or the overhead bin 210. Furthermore, the barcode reader 202 may provide selective access to the overhead bin 210 based on comparing an encoded seat identifier with an access privilege.

In embodiments, the system 200 may also include a visual indicator 310 which may be indicative of a status of the overhead bin 210. For example, the visual indicator 310 may include one or more light emitting diodes (LED). The LED may include any suitable light emitting diode, such as, but not limited to, a bi-color LED. Where the LED is a bi-color LED, a first color (e.g., green) may indicate the overhead bin 210 is closed and a second color (e.g., red) may indicate the overhead bin 210 is opened and/or opening. By the LED, a user may be visually indicated as to a condition of the overhead bin 210. As depicted, the visual indicator 310 may be included on the barcode reader 202, although this is not intended to be limiting.

The system 200 may similarly include an aural indicator indicative of a status of the overhead bin 210. For example, the aural indicator may include a first aural indication, which indicates the boarding pass 100 is not eligible for storage and/or that the barcode 102 has been unsuccessfully read by the barcode reader 202.

Figure 4:
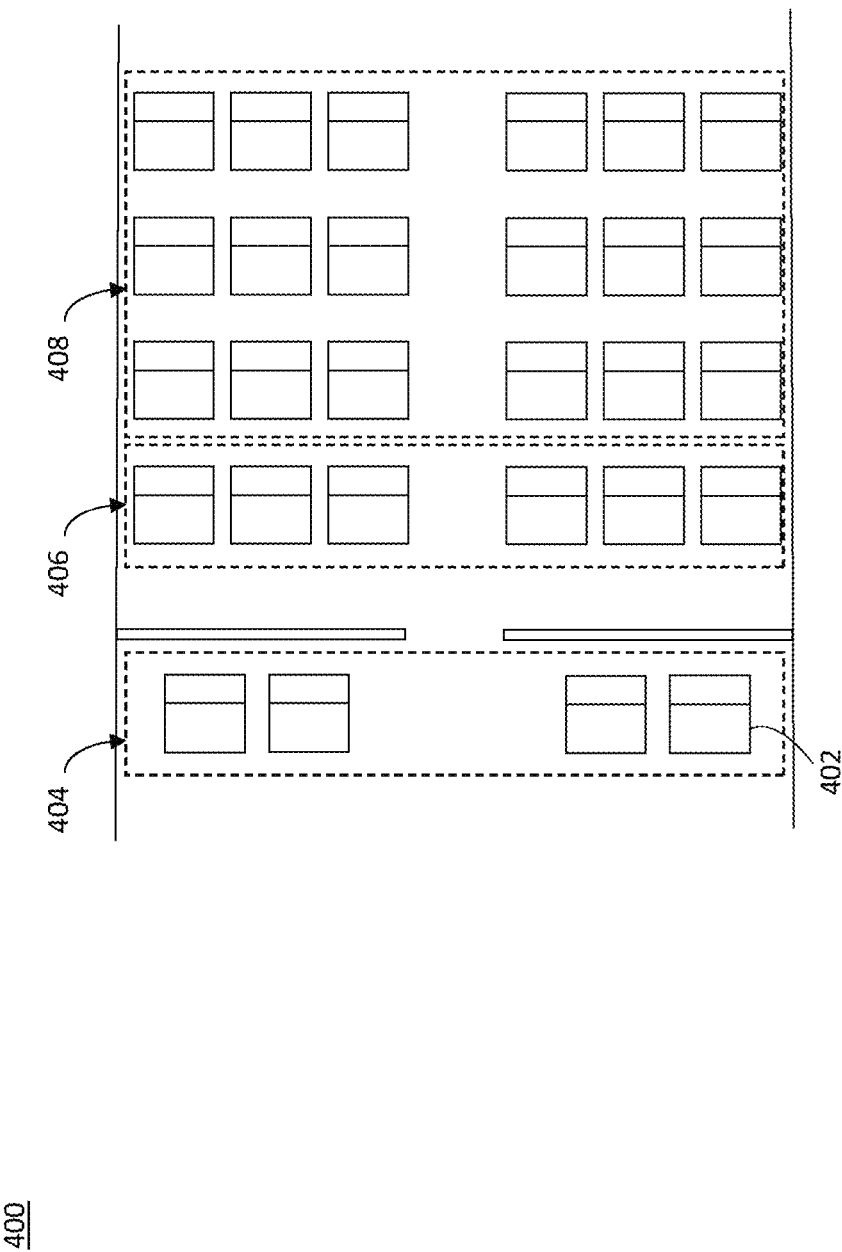
FIG. 4 is a top view of an exemplary seating zone floorplan, in accordance with one or more embodiments of the present disclosure.

FIG. 4 depicts an exemplary seating zone floorplan 400, in accordance with one or more embodiments of the present disclosure. The seating zone floorplan 400 may generally include a plurality of seats 402 which are commonly associated into one or more seating zones. For example, the seating zone floorplan 400 may include a business class seat zone 404, an extra legroom seat zone 406, an economy class seat zone 408, and/or a crew seat zone (not depicted). As may be understood, the configuration of the seating zone floorplan 400 is not intended to be limiting. In this regard, the seating zone floorplan and associated seating zones may generally be based on a configuration of an airline's aircraft. The seating zone floorplan 400 is thus provided as an example of zones 404-408 which may be used for access privilege purposes.

Figure 5:
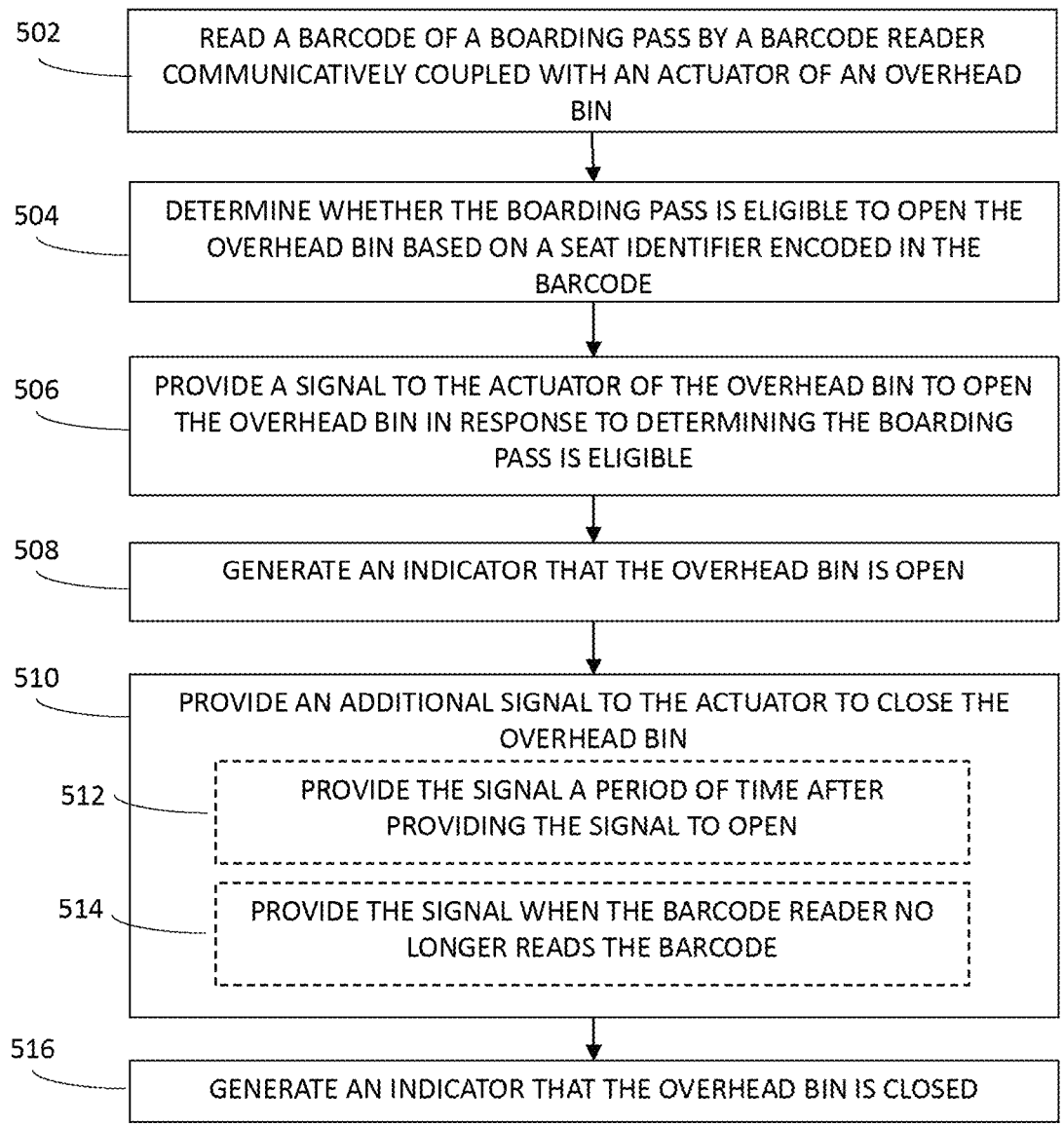
FIG. 5 depicts a flowchart of a method, in accordance with one or more embodiments of the present disclosure.

FIG. 5 depicts a flowchart of a method 500, in accordance with one or more embodiments of the present disclosure. It is noted herein that the steps of the method 500 may be implemented all or in part by system 200. It is further recognized that the method 500 is not limited to the system 200 in that additional or alternative system-level embodiments may carry out all or part of the steps.

The method 500 may include a step 502 of reading a barcode of a boarding pass by a barcode reader, wherein the barcode reader is communicatively coupled with an actuator of an overhead bin. The barcode reader may be communicatively coupled with the overhead bin by a controller, in accordance with one or more embodiments of the present disclosure.

The method 500 may include a step 504 of determining whether the boarding pass is eligible to open the overhead bin based on a seat identifier encoded in the barcode read by the barcode reader. The seat identifier may include one or more of a seat number, a seat row, or a seat zone. The eligibility determination may include comparing the seat identifier with an access privilege.

The method 500 may include a step 506 of providing a signal to the actuator of the overhead bin to open the overhead bin in response to determining the boarding pass is eligible. The signal may include sending power to the actuator. The signal may also include a digital signal.

The method 500 may optionally include a step 508 of generating an indicator that the overhead bin is open. The indicator may include one or more of an aural indicator or a visual indicator.

The method 500 may include a step 510 of providing a signal to the actuator to close the overhead bin. In response to the signal, the actuator may close the overhead bin. The step 510 may further include a step 512 of sending the signal a period of time after providing the signal to open the overhead bin. The period of time may be any suitable period of time, such as, but not limited to, 10 minutes. The step 510 may further include a step 514 of sending the signal when the barcode reader no longer reads the barcode (e.g., when the boarding pass is removed from the barcode reader). In this regard, the barcode may be used to selectively send a signal to the actuator, thereby allowing for opening and closing of the overhead bin at a desired time. This may be desirable in improving a user experience with the automatic overhead bin.

The method 500 may optionally include a step 516 of generating an additional indicator that the overhead bin is closed. The indicator may include one or more of an aural indicator or a visual indicator.

Figure 6:
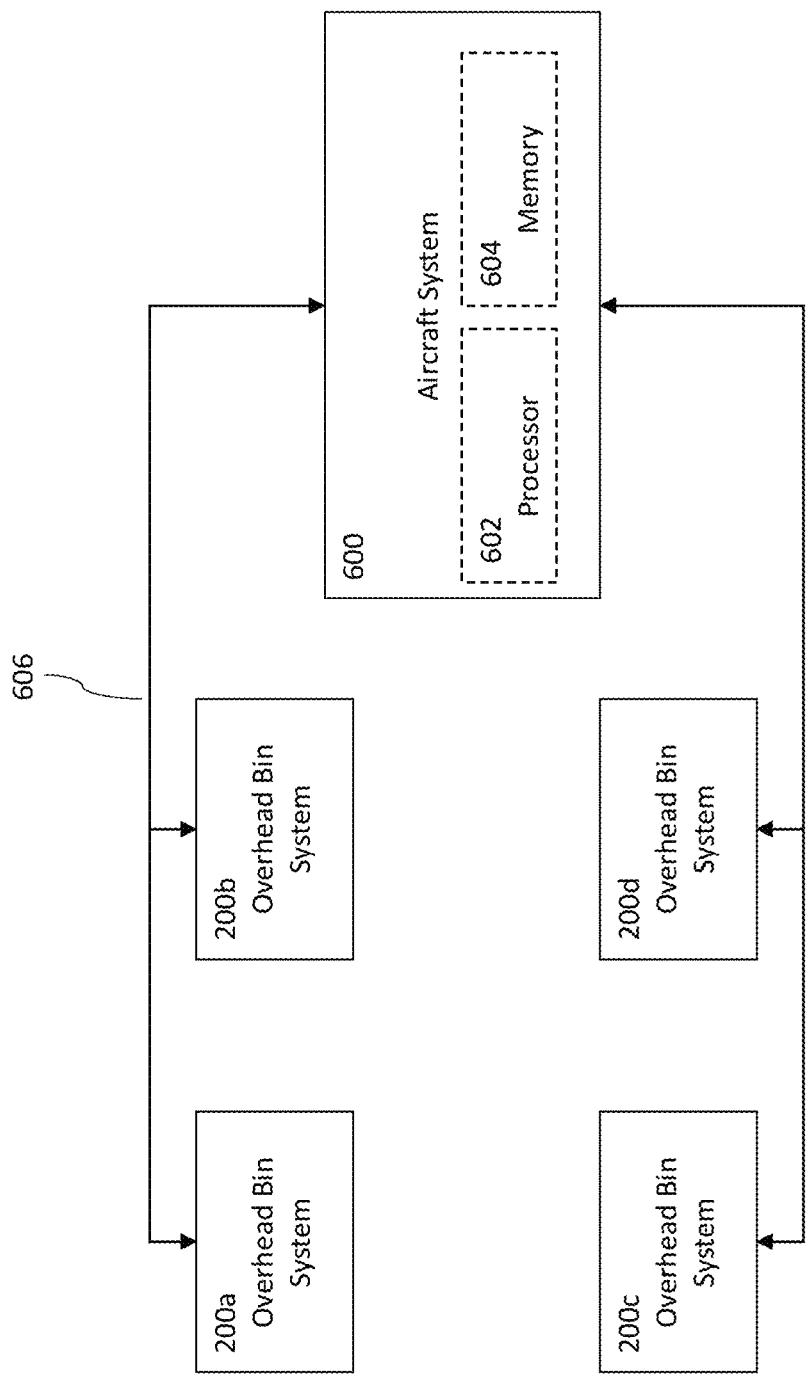
FIG. 6 depicts a plurality of overhead storage systems coupled with an aircraft system, in accordance with one or more embodiments of the present disclosure.

FIG. 6 depicts a plurality of overhead storage systems 200 (e.g., 200a-200d) communicatively coupled with an aircraft system 600, in accordance with one or more embodiments. By the connection between the systems 200a-200d and the aircraft system 600, power may be transmitted between the systems 200a-200d and the aircraft system 600. In this regard, the aircraft system 600 may be configured to power one or more of the barcode reader 202, the controller 204, or the actuator 212 of the systems 200a-200d. Furthermore, various signals may be transmitted between the systems 200a-200d and the aircraft system 600, as set forth below.

For example, the systems 200a-200d may provide a signal to the aircraft system 600 that a door of one or more overhead bins (e.g., overhead bin 210) are currently open. The signal may then be displayed to a steward. The ability to display an open overhead bin may be beneficial during a taxi, takeoff, or landing procedure, during which the overhead bins are to remain closed.

By way of another example, the systems 200a-200d may be configured to receive a signal from the aircraft system 600 to close an open overhead bin (e.g., overhead bin 210). In this regard, the steward may see that the overhead bin is open and/or receive a notification from the system 200. The steward may then perform a visual check to verify that no passengers are within range of the overhead bin. Finally, the steward may issue the signal from the aircraft system 600 to one or more of the systems 200a-200d to remotely close the overhead bin.

The aircraft system 600 may also include a processor 602 and a memory 604. In embodiments, the systems 200a-200d may be configured to provide the barcode 102 read by the barcode reader to the aircraft system 600. The aircraft system 600 may then store the barcode 102 in the memory 604. By storing the barcode 102 in the memory 604, a database of boarding passes 100 scanned by the systems 200a-200d may be generated. Such database may allow for various data processing. For example, the database may be used to inventory which users accessed which overhead bins. This may be beneficial for various purposes, such as, but not limited to determining a user associated with luggage left in the overhead bin. The database may further include receiving a time at which the barcode 102 was scanned. By collecting timing data, the system 200 may autonomously be used to collect data regarding how quickly users are being seated (e.g., for evaluating a performance of a steward, for determining an optimal method of boarding the plane, etc.).

Such signals may optionally be transmitted by way of a network bus 606 (e.g., a controller area network (CAN) bus) which communicatively couple the systems 200a-200d and the aircraft system 600. As may be understood, the configuration of the network bus 606 is not intended to be limiting, but is merely provided as an example of communicatively connecting the plurality of systems 200a-200d to the aircraft system 600.

Referring generally again to FIGS. 1-6, the system 200 is described in further detail.

In embodiments, the system 200 is configured to be compatible with one or more existing overhead bins of an airplane. In this regard, the barcode reader 202 may be mounted to a wall (e.g., the wall 308) of the airplane cabin.

The actuator 212 may further be configured to mount to the existing overhead bin of the airplane cabin (e.g., a shelf bin, a pivot bin, or a translating bin). In this regard, the system 200 may be retrofitted onto existing overhead bins.

In embodiments, the boarding pass 100 may include an encoded seat identifier which is common among a plurality of seats, rows, and/or zones (e.g., a master pass). For example, a steward (e.g., a flight attendant) may use the master pass to help passengers across multiple seats, rows, and/or zones. By the master pass, the steward may access any of a plurality of overhead storage bin on an airplane.

In embodiments, the barcode reader 202 may include the controller 204 in a housing of the barcode reader 202. In other embodiments, the controller 204 may be housed in the overhead bin 210.

The processor 206 (or similarly the processor 602) may include any processor or processing element known in the art. For the purposes of the present disclosure, the term "processor" or "processing element" may be broadly defined to encompass any device having one or more processing or logic elements (e.g., one or more micro-processor devices, one or more application specific integrated circuit (ASIC) devices, one or more field programmable gate arrays (FPGAs), or one or more digital signal processors (DSPs)). In this sense, the processor 206 may include any device configured to execute algorithms and/or instructions (e.g., program instructions stored in memory 208). Moreover, components of the system 200 may include a processor or logic elements suitable for carrying out at least a portion of the steps described in the present disclosure. Therefore, the above description should not be interpreted as a limitation on the embodiments of the present disclosure but merely as an illustration. Further, the steps described throughout the present disclosure may be carried out by a single controller or, alternatively, multiple controllers.

The memory 208 (or similarly the memory 604) may include any storage medium known in the art suitable for storing program instructions executable by the associated processor 206. For example, the memory 208 may include a non-transitory memory medium. By way of another example, the memory 208 may include, but is not limited to, a read-only memory (ROM), a random-access memory (RAM), a magnetic or optical memory device (e.g., disk), a solid-state drive and the like. It is further noted that memory 208 may be housed in a common controller housing with the processor 206. In embodiments, the memory 208 may be located remotely with respect to the physical location of the processor 206 and controller 204. For instance, the processor 206 of controller 204 may access a remote memory (e.g., server), accessible through a network of the airplane.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

What is claimed is:

1. A system, comprising:
   a barcode reader including a slot configured to receive a boarding pass, wherein the barcode reader is configured to read a barcode of the boarding pass when the boarding pass is received by the slot, wherein the barcode includes an encoded seat identifier;
   an overhead bin including an actuator configured to open the overhead bin; and
   a controller communicatively coupled with the barcode reader and the actuator, the controller including a processor and a memory, the processor configured to execute program instructions maintained on the memory causing the processor to:
     determine whether the boarding pass is eligible to open the overhead bin based on the encoded seat identifier;
     upon the determination the boarding pass is eligible, provide a signal to the actuator causing the actuator to open the overhead bin; and
     provide an additional signal to the actuator causing the actuator to close the overhead bin.

2. The system of claim 1, wherein the barcode reader continually reads the barcode of the boarding pass when the boarding pass is inserted into the receiving slot, wherein the additional signal provided to the actuator causing the actuator to close the overhead bin is provided when the barcode reader no longer reads the barcode of the boarding pass.

3. The system of claim 1, wherein the additional signal provided to the actuator causing the actuator to close the overhead bin is provided a period of time after providing the signal to open the overhead bin.

4. The system of claim 1, wherein the barcode is a two-dimensional barcode encoded in a PDF417 format.

5. The system of claim 1, wherein the boarding pass is a printed boarding pass.

6. The system of claim 1, wherein the boarding pass is displayed on a user device, wherein the slot of the barcode reader has a width for receiving the user device.

7. The system of claim 1, wherein the overhead bin is a shelf bin.

8. The system of claim 1, wherein the overhead bin is a pivot bin.

9. The system of claim 1, wherein the overhead bin is a translating bin.

10. The system of claim 1, wherein the actuator is a hydraulic cylinder.

11. The system of claim 1, further comprising a visual indicator indicative of a status of the overhead bin, wherein the visual indicator includes at least a closed status and an open status.

12. The system of claim 1, wherein the processor determines whether the boarding pass is eligible to open the overhead bin by comparing the encoded seat identifier with an access privilege associated with the overhead bin.

13. The system of claim 1, wherein the barcode reader is attached to a wall of an aircraft cabin.

14. The system of claim 1, wherein the controller is communicatively coupled with an aircraft system.

15. The system of claim 14, wherein the aircraft system is configured to store the barcode read by the barcode reader in a memory of the aircraft system.

16. A method comprising:
reading a barcode of a boarding pass by a barcode reader, wherein the barcode reader is communicatively coupled with an actuator of an overhead bin;
determining whether the boarding pass is eligible to open the overhead bin based on a seat identifier encoded in the barcode;
generating an indicator that the overhead bin is open;
providing a signal to the actuator of the overhead bin to open the overhead bin in response to determining the boarding pass is eligible;
providing an additional signal to the actuator to close the overhead bin; and
generating an additional indicator that the overhead bin is closed.

17. The method of claim 16, wherein providing the additional signal to the actuator to close the overhead bin further comprises providing the signal a period of time after providing the signal to open the actuator.

18. The method of claim 16, wherein providing the additional signal to the actuator of the overhead bin to close the overhead bin further comprises providing the signal when the barcode reader no longer reads the barcode.

19. The method of claim 16, wherein determining whether the boarding pass is eligible to open the overhead bin based on the seat identifier encoded in the barcode includes comparing the seat identifier with an access privilege.

20. The method of claim 16, wherein the boarding pass is a master pass with an encoded seat identifier which is configured to access a plurality of overhead bins among an airplane.

* * * * *